United States Patent
Baek et al.

(10) Patent No.: US 8,936,867 B2
(45) Date of Patent: Jan. 20, 2015

(54) SECONDARY BATTERY PACK HAVING PCM ASSEMBLY AND INSULATING MOUNTING MEMBER OF NOVEL STRUCTURE

(75) Inventors: Ju-Hwan Baek, Chungcheongbuk-do (KR); Ki Eob Moon, Seoul (KR); Soonkwang Jung, Seoul (KR); Cheol Woong Lee, Seoul (KR)

(73) Assignee: LG Chem, Ltd., Seoul (KR)

( * ) Notice: Subject to any disclaimer, the term of this patent is extended or adjusted under 35 U.S.C. 154(b) by 700 days.

(21) Appl. No.: 12/747,730

(22) PCT Filed: Nov. 14, 2008

(86) PCT No.: PCT/KR2008/006714
§ 371 (c)(1),
(2), (4) Date: Nov. 5, 2010

(87) PCT Pub. No.: WO2009/078584
PCT Pub. Date: Jun. 25, 2009

(65) Prior Publication Data
US 2011/0045322 A1      Feb. 24, 2011

(30) Foreign Application Priority Data
Dec. 14, 2007   (KR) .................. 10-2007-0131654

(51) Int. Cl.
| H01M 2/02 | (2006.01) |
| H01M 10/42 | (2006.01) |
| H01M 2/06 | (2006.01) |
| H01M 2/22 | (2006.01) |
| H01M 10/0525 | (2010.01) |

(52) U.S. Cl.
CPC ................ *H01M 10/42* (2013.01); *H01M 2/06* (2013.01); *H01M 2/22* (2013.01); *H01M 10/425* (2013.01); *H01M 10/0525* (2013.01); *H01M 2200/106* (2013.01)
USPC .............................. 429/179; 429/65; 429/177

(58) Field of Classification Search
USPC ........................................... 429/65, 177, 179
See application file for complete search history.

(56) References Cited

U.S. PATENT DOCUMENTS

| 7,939,189 B2 * | 5/2011 | Kim et al. .......................... 429/7 |
| 8,137,837 B2 * | 3/2012 | Jung et al. ..................... 429/179 |
| 2005/0122667 A1 | 6/2005 | Moon | |

FOREIGN PATENT DOCUMENTS

| JP | 2001-307694 A | 11/2001 |
| JP | 2006-040893 A | 2/2006 |

(Continued)

*Primary Examiner* — Tracy Dove
(74) *Attorney, Agent, or Firm* — Birch, Stewart, Kolasch & Birch, LLP

(57) ABSTRACT

Disclosed herein is a secondary battery pack including a battery cell, a protection circuit module (PCM) assembly having a connection member (A), an insulative mounting member having a connection member (B) embedded therein, and an insulative cap. The connection member (B) is coupled to a second electrode terminal of the battery cell by welding, such that the connection member (B) is electrically connected to the second electrode terminal of the battery cell, in a state in which the insulative mounting member is mounted on the battery cell. The connection member (A) is coupled to a first electrode terminal of the battery cell upward from a PCM, such that the connection member (A) is electrically connected to the first electrode terminal of the battery cell. The electrical connection between the PCM assembly and the connection member (B) is achieved in a physical contact fashion.

16 Claims, 3 Drawing Sheets

(56) References Cited

FOREIGN PATENT DOCUMENTS

| | | |
|---|---|---|
| JP | 2006-164601 A | 6/2006 |
| KR | 10-2004-0029757 A | 4/2004 |
| KR | 10-2005-0081175 A | 8/2005 |
| KR | 10-2005-0121116 A | 12/2005 |
| KR | 10-2006-0037850 A | 5/2006 |
| KR | 10-2008-0101573 A | 9/2006 |
| WO | WO 2007/046579 A1 | 4/2007 |
| WO | WO 2008/066287 A1 | 6/2008 |
| WO | WO 2009/051388 A2 | 4/2009 |

\* cited by examiner

SECONDARY BATTERY PACK HAVING PCM ASSEMBLY AND INSULATING MOUNTING MEMBER OF NOVEL STRUCTURE

TECHNICAL FIELD

The present invention relates to a secondary battery pack having a protection circuit module (PCM) assembly and an insulative mounting member of a novel structure, and, more particularly, to a secondary battery pack including a battery cell, a protection circuit module (PCM) assembly having a connection member (A), an insulative mounting member having a connection member (B) embedded therein, and an insulative cap, wherein the connection member (B) is coupled to a second electrode terminal of the battery cell by welding, such that the connection member (B) is electrically connected to the second electrode terminal of the battery cell, in a state in which the insulative mounting member is mounted on the battery cell, the connection member (A) is coupled to a first electrode terminal of the battery cell upward from a PCM, such that the connection member (A) is electrically connected to the first electrode terminal of the battery cell, and the electrical connection between the PCM assembly and the connection member (B) is achieved in a physical contact fashion.

BACKGROUND ART

As mobile devices have been increasingly developed, and the demand of such mobile devices has increased, the demand of secondary batteries has also sharply increased. Among them is a lithium secondary battery having high energy density and operating voltage and excellent preservation and service-life characteristics, which has been widely used as an energy source for various electronic products as well as the mobile devices.

On the other hand, various kinds of combustible materials are contained in the lithium secondary battery. As a result, the lithium secondary battery may be heated or explode due to the overcharge of the battery, the overcurrent in the battery, or other physical external impacts. That is, the safety of the lithium secondary battery is very low. Consequently, a positive temperature coefficient (PTC) element and a protection circuit module (PCM), as safety elements for effectively controlling an abnormal state of the battery, such as the overcharge or the overcurrent of the battery are connected to the lithium secondary battery.

Generally, the PCM is connected to the battery cell via conductive nickel plates by welding or soldering. That is, the nickel plates are connected to electrode tabs of the PCM by welding or soldering, and then the nickel plates are connected to electrode terminals of the battery cell by welding or soldering. In this way, the PCM is connected to the battery cell to manufacture a battery pack.

It is required for the safety elements, including the PCM, to be maintained in electrical connection with the electrode terminals of the battery cell and, at the same time, to be electrically isolated from other parts of the battery cell. Consequently, a plurality of insulative mounting members or parts are required to construct such connection, which complicates the battery assembly process, and reduces a space for receiving the battery cell.

Also, a large number of welding or soldering processes are required to construct the battery pack, and the welding or soldering processes must be carried out with high precision because of the small structure of the secondary battery. As a result, a defect possibility is great. Furthermore, the welding or soldering processes are added during the manufacturing process of a product, which increases the manufacturing costs.

Consequently, research has been actively made on a technology for reducing the number of parts loaded on the top of the battery cell and increasing the capacity of the battery cell. For example, Korean Patent Application Publication No. 2005-0121116 discloses a secondary battery having a protection circuit unit coupled to the outer surface of a bare cell, wherein the protection circuit unit is configured in the shape of an assembly made of molding resin, connection terminals are formed at the interface between the protection circuit unit and the outer surface of the bare cell for coupling the protection circuit unit and the bare cell, and the protection circuit unit is provided with a space for exposing a contact region between the protection circuit unit and the connection terminals of the bare cell where the protection circuit unit and the connection terminals of the bare cell are to be welded such that the welding is easily carried out.

In the above-described conventional technology, however, it is required to form the space for exposing the region to be welded to the outside between the bare cell and the protection circuit unit. As a result, the overall volume of the battery pack increases, and therefore, the space for receiving the battery cell decreases.

Also, Korean Patent Application Publication No. 2006-0101573 discloses a battery protection circuit board having battery cell connection terminals, wherein a lead-type static characteristic poly switch is directly connected to one of the battery cell connection terminals on the battery protection circuit board by soldering such that the lead-type static characteristic poly switch is mounted on the surface of the battery protection circuit board.

However, the disclosed battery protection circuit board is manufactured by a series of complicated processes including a process of manufacturing a printed circuit board (PCB), a process of applying paste-type solder to the manufactured PCB and mounting parts constituting a protection circuit, including the static characteristic poly switch, on a predetermined position of the PCB using a mounting apparatus, a reflow process, a process of heat-treating the protection circuit board passing through the reflow process, and a process of inspecting the protection circuit board including the lead-type static characteristic poly switch. Consequently, the process of manufacturing the battery is complicated, and therefore, the productivity is lowered.

Consequently, there is a high necessity for a technology that is capable of reducing the number of members mounted to the top of the battery cell to simplify the assembly process, reducing the number of welding processes to decrease a defect rate, achieving stable coupling between the members loaded on the top of the battery cell, and increasing the capacity of the battery cell while solving the above-mentioned problems caused in the conventional art.

DISCLOSURE OF INVENTION

Technical Problem

Therefore, the present invention has been made to solve the above-mentioned problems, and other technical problems that have yet to be resolved.

Specifically, it is an object of the present invention to provide a secondary battery pack wherein the number of parts necessary to construct the battery pack is reduced and a process of assembling the battery pack is simplified, to reduce the battery manufacturing costs, the battery pack has a stable coupling structure to minimize defect and internal resistance change due to external impact, and the capacity of the battery pack is increased as compared with other battery packs having the same standard.

It is another object of the present invention to provide a protection circuit module (PCM) assembly of a novel structure in which connection members are coupled to each other in a specific fashion to manufacture the secondary battery pack.

TECHNICAL SOLUTION

In accordance with one aspect of the present invention, the above and other objects can be accomplished by the provision of a secondary battery pack including a battery cell having an electrode assembly of a cathode/separator/anode structure mounted in a battery case together with an electrolyte in a sealed state and a first electrode terminal and a second electrode terminal formed at an upper end of the battery case, a protection circuit module (PCM) assembly including a PCM and a connection member (A) coupled to a bottom of the PCM, the PCM assembly being provided in one side thereof with a through-hole for coupling with an insulative mounting member, the insulative mounting member constructed in a structure in which the PCM assembly is loaded on the top of the insulative mounting member, the insulative mounting member having a connection member (B) coupled to the second electrode terminal of the battery cell, the connection member (B) being embedded in the insulative mounting member while a top and bottom of the connection member (B) are exposed to the outside, the insulative mounting member having a coupling member formed at a position corresponding to the through-hole, the insulative mounting member being mounted at a top of the battery cell, and an insulative cap coupled to an upper end of the battery cell for covering the insulative mounting member in a state in which the PCM assembly is loaded on the insulative mounting member, wherein the connection member (B) is coupled to the second electrode terminal of the battery cell by welding, such that the connection member (B) is electrically connected to the second electrode terminal of the battery cell, in a state in which the insulative mounting member is mounted on the battery cell, the connection member (A) protrudes from one end of the PCM assembly in the lateral direction such that a region of the connection member (A) electrically connected to the battery cell is exposed upward from the PCM assembly, whereby the connection member (A) is coupled to the first electrode terminal of the battery cell upward from the PCM, such that the connection member (A) is electrically connected to the first electrode terminal of the battery cell, in a state in which the PCM assembly is loaded on the insulative mounting member by the insertion of the coupling member into the through-hole, and the electrical connection between the PCM assembly and the connection member (B) is achieved in a physical contact fashion.

That is, the secondary battery pack according to the present invention is constructed in a structure in which the connection member (A), protruding from one end of the PCM assembly in the lateral direction, is electrically connected to the first electrode terminal of the battery cell upward, in a state in which the PCM assembly is loaded on the insulative mounting member, and the connection member (B), embedded in the insulative mounting member while the top and bottom of the connection member (B) are exposed to the outside, is electrically connected to the PCM assembly by physical contact. Consequently, the assembly of the secondary battery pack is achieved in a simple connection fashion, and therefore, the easiness of the manufacture is improved, and the manufacturing efficiency is greatly improved.

Also, the connection member (A), extending from one end of the PCM, is not bent, and the connection member (B), embedded in the insulative mounting member, does not require an additional loading space. Consequently, it is possible to minimize a dead space created by bending the connection members for electrical connection of the PTC elements in the conventional art, and therefore, to manufacture a battery pack having energy density higher than other battery packs having the same standard.

Meanwhile, the applicant of the present application has proposed a secondary pack constructed in a structure in which the number of members mounted on the top of a battery cell is minimized, and the assembling process of the members is further simplified, wherein an opening is formed in the central part of a PCM, and connection members are in tight contact with the bottom of the opening, whereby the coupling between the connection members and electrode terminals of the battery cell is achieved by welding through the opening, which is disclosed in Korean Patent Application No. 2007-0105189.

However, the secondary battery pack with the above-described construction has a restriction in that the opening structure of the PCM must be formed at a position corresponding to the electrode terminals of the battery cell, and therefore, external input and output terminals cannot be located at the central part of the PCM where the opening is formed.

On the other hand, the secondary battery pack according to the present invention is constructed in a structure in which no opening is formed in the PCM although the number of members mounted on the top of a battery cell is minimized, and the assembling process of the members is further simplified. Consequently, the secondary battery pack according to the present invention is characterized in that the positions of the external input and output terminals formed at the top of the PCM are not restricted. Consequently, it is possible for the external input and output terminals to be formed at desired positions on the top of the PCM depending upon the specification of a device in which the secondary battery pack is used.

It is required for the battery case to exhibit easy processability and a mechanical strength of a predetermined level or more. For example, the battery case may be a metal container. Preferably, the battery case is an aluminum container or a stainless steel container.

In an exemplary embodiment, the first electrode terminal is a cathode terminal, and the second electrode terminal is an anode terminal. For example, a prismatic battery cell is constructed in a structure in which an electrode terminal protruding from the top of a battery cell and the battery case form an anode terminal and a cathode terminal, respectively, and an insulation member is disposed between the electrode terminal and the battery case for securing the insulation between the electrode terminal and the battery case. In the prismatic battery cell, therefore, the first electrode terminal is the top of the battery case, serving as the cathode terminal, and the second electrode terminals is the anode terminal protruding from the top of the battery case.

As previously described, the connection member (A) is coupled to the bottom of the PCM in a structure in which the connection member (A) protrudes from one end of the PCM assembly in the lateral direction while the connection member (A) is connected to a circuit of the PCM.

The coupling (electrical connection) between the connection member (A) and the PCM may be achieved in various methods. Preferably, the connection member (A) is coupled to the bottom of the PCM by a surface mount technology (SMT). In case of soldering, paste is left at the bottom of the PCM. In case of welding, the bottom of the PCM is damaged by heat. However, the SMT prevent the paste from being left at the bottom of the PCM and the bottom of the PCM from being damaged by heat. In addition, the SMT achieves the coupling between the connection member (A) and the PCM more accurately and reliably than the conventional welding or soldering method. Consequently, the use of the SMT is preferable. For reference, the SMT is mainly used to mount surface mount parts on an electronic board, such as a printed circuit board (PCB).

In another exemplary embodiment, the connection member (A) is constructed in a structure of a positive temperature coefficient (PTC) element including a PTC body, a PCM coupling part coupled to a top of the PTC body, and a battery cell coupling part coupled to a bottom of the PTC body, the battery cell coupling part protruding from one end of the PCM assembly in the lateral direction such that the battery cell coupling part is exposed upward from the PCM assembly.

The connection member (A), which is coupled to the PTC element, interrupts current flowing to the upper assembly of the battery pack, when the temperature of the battery pack abruptly increases due to an internal short circuit or the like, thereby improving the safety of the battery pack. Also, it is possible to achieve the coupling between the connection member (A) and the battery cell upward from the PCM by welding through the provision of the battery cell coupling part protruding from one end of the PCM assembly in the lateral direction, thereby contributing to the improvement in productivity of the battery pack.

In the above-described structure, the PTC body contains a material of which resistance changes according to temperature. Consequently, when the internal temperature of the battery abruptly increases, the PTC body interrupts electric current. Also, the coupling parts are coupled to the top and bottom of the PTC body. For example, the PTC body may include a PTC material layer made of a polymer composite and metal foils joined to a top and bottom of the PTC material layer.

Also, the kind of the PCM coupling part and the battery cell coupling part of the PTC element is not particularly restricted so long as the PCM coupling part and the battery cell coupling part are made of a conductive material. Preferably, the PCM coupling part and the battery cell coupling part are formed of a metal plate, such as a nickel plate.

Meanwhile, the remaining region of the connection member (B), excluding the top of the connection member (B) facing a terminal connection part of the PCM assembly and the bottom of the connection member (B) facing the corresponding electrode terminal of the battery cell, is embedded in the insulative mounting member.

Consequently, the electrically insulated state of the remaining region of the connection member (B), excluding the top of the connection member (B) facing a terminal connection part of the PCM assembly and the bottom of the connection member (B) facing the corresponding electrode terminal of the battery cell, is effectively maintained by the insulative mounting member, and therefore, the electrical connection state between the electrode terminals of the battery cell and the PCM assembly is stabled achieved.

In the above-described structure, the connection member (B) may be embedded in the insulative mounting member in various methods. For example, it is possible to simultaneously form the connection member (B) during an insert injection molding process, which is a method of coupling or combining different materials in an integrated structure. This method is preferable since the number of manufacturing processes is reduced. Consequently, the connection member (B) may be embedded in the insulative mounting member when forming the insulative mounting member by insert injection molding, to which, however, the present invention is limited. For example, a predetermined opening may be formed in the insulative mounting member, and the connection member (B) may be coupled in the opening of the insulative mounting member while the top and bottom of the connection member (B) are exposed to the outside.

In an exemplary embodiment, at least a portion of the connection member (B) embedded in the insulative mounting member protrudes from the top of the insulative mounting member in the shape of a protrusion in a direction perpendicular to the top of the insulative mounting member in a state in which the portion of the connection member (B) is exposed upward, such that the connection member (B) is stably fixed to the insulative mounting member while the remaining region of the connection member (B), excluding the top of the connection member (B) facing the terminal connection part of the PCM assembly and the bottom of the connection member (B) facing the corresponding electrode terminal of the battery cell, is embedded in the insulative mounting member, as previously described.

The protrusion structure protruding in the perpendicular direction increases the coupling strength between the connection member (B) and the insulative mounting member and thus effectively prevents the connection member (B) from being separated from the insulative mounting member, in which the connection member (B) is embedded, by an external force.

The kind of the connection member (B) is not particularly restricted so long as the connection member (B) is made of a conductive material. Preferably, the connection member (B) is formed of a nickel plate.

The insulative mounting member has a size less than the top of the battery cell in the lateral direction of the battery cell such that the insulative mounting member is provided with a region where the connection member (A) is connected to the battery cell, and the insulative mounting member is provided with an opening formed at a position spaced a predetermined distance from the connection member (B) coupled to the second electrode terminal of the battery cell such that an upper-end case protrusion of the battery cell (a sealed electrolyte injection port) is exposed upward through the opening.

Since the insulative mounting member has a size less than the top of the battery cell in the lateral direction of the battery cell, it is possible to easily secure a space where the connection member (A) is located between the one end of the PCM assembly and the one end of the top of the battery cell.

The shape of the connection member (B) and the opening may be various. For example, the connection member (B) may be formed in the plan shape of a rectangle since the connection member (B) contacts the second electrode terminal. The opening may be formed in the plan shape of a circle corresponding to the sealed electrolyte injection port, which protrudes in the shape of a circle.

Meanwhile, the PCM is mounted on the top of the insulative mounting member. Consequently, the insulative mounting member may be provided at opposite ends thereof in the lateral direction with receiving sidewalls protruding upward such that the PCM assembly is stably mounted to the insulative mounting member by the receiving sidewalls.

Specifically, the upper ends of the sidewalls may be coupled to the PCM assembly while supporting the PCM assembly. This structure provides a predetermined space between the PCM assembly and the insulative mounting member, thereby securing a physical contact space between the connection member (B), embedded in the insulative mounting member, and the PCM assembly.

Although the coupling of the insulative mounting member to the top of the battery case is automatically achieved when a welding operation is carried out to connect the connection member (B), embedded in the insulative mounting member, to the battery cell, the coupling between the top of the battery case and the insulative mounting member may be achieved, for example, by bonding, to secure the easiness of the battery pack assembling process and more stable coupling.

The insulative cap serves to protect the battery cell from external impact, increase the mechanical strength of the members mounted on the top of the battery cell, and maintain electrical insulation. Preferably, the insulative cap extends downward by a predetermined length such that at least a portion of the insulative cap covers the outside surface of the upper end of the battery cell in a state in which the insulative cap is coupled to the upper end of the battery cell, thereby improving the coupling to the battery cell. In order to maximize such an effect, the downward extension of the insulative cap is preferably joined to the upper end of the battery cell by bonding or by mechanical coupling.

In addition to the insulative cap coupled to the upper end of the battery cell, an additional insulative cap (a bottom cap) may be also mounted to the lower end of the battery cell. Also, a sheathing film may be attached to an outer surface of the battery case. Consequently, the battery cell is protected from external impact, and the electrical insulation of the battery cell is maintained, by the provision of the sheathing film. Preferably, the sheathing film is attached to the outer surface of the battery case such that the sheathing film covers the lower extension of the insulative cap.

The secondary battery pack according to the present invention may be applicable in various manners irrespective of the kind and appearance of the battery cell. Preferably, the present invention is applicable to a battery pack including a prismatic lithium secondary battery cell as the battery cell.

In accordance with another aspect of the present invention, there is provided a PCM assembly mounted to a battery cell, including a PCM, a connection member (A) coupled to a bottom of the PCM by an SMT, and external input and output terminals formed at a top of the PCM, wherein the connection member (A) is coupled to the PCM, while the connection member (A) protrudes from one end of the PCM assembly in the lateral direction, such that a welded region of the connection member (A) with respect to the battery cell is exposed upward from the PCM assembly, and the external input and output terminals are formed at an arbitrary region selected from a group consisting of a middle, a left side, and a right side of the PCM.

Generally, the PCM is a separate member, which is mounted on the top of the battery cell while being electrically connected to the top of the battery cell. Consequently, complicated and troublesome processes for coupling the PCM to the battery cell, such as a large number of welding or soldering processes, are required to mount the PCM to the outside of the battery cell, with the result that a defect rate increases, and, in addition, a space necessary to mount the PCM to the top of the battery cell is required.

In the PCM assembly according to the present invention, on the other hand, the connection member (A) is coupled to the top of the battery cell by an SMT in a state in which the connection member (A) protrudes from one end of the PCM assembly in the lateral direction. Consequently, a defect rate at the connection region is greatly reduced, and therefore, the assembling process is simplified, as compared with the conventional welding or soldering method.

Also, no opening for welding is formed in the PCM. When the external input and output terminals are formed at the top of the PCM, therefore, their positions are not restricted. Consequently, it is possible to selectively form the external input and output terminals at an arbitrary region, for example, the middle, the left side, or the right side of the PCM. This structure enables more flexible design of the battery pack.

In accordance with a further aspect of the present invention, there is provided an insulative mounting member mounted to a battery cell, including a main body having a size less than a top of the battery cell in the lateral direction, the main body being provided with an opening through which an upper-end case protrusion of the battery cell (a sealed electrolyte injection port) is exposed upward, and a connection member (B) embedded in a portion of the main body by insert injection molding, wherein the connection member (B) is embedded in the insulative mounting member such that only a top of the connection member (B) facing a terminal connection part of a PCM assembly and a bottom of the connection member (B) facing a corresponding electrode terminal of the battery cell are exposed to the outside, the bottom of the connection member (B) is electrically connected to the electrode terminal of the battery cell by welding, and the top of the connection member (B) is electrically connected to the terminal connection part of the PCM assembly by physical contact.

Since the top and bottom of the connection member (B) are exposed toward the top and bottom of the insulative mounting member, it is possible to connect the bottom of the connection member (B) to the corresponding electrode terminal of the battery cell by welding and to electrically connect the top of the connection member (B) to the terminal connection part of the PCM assembly by physical contact, thereby simplifying the process of manufacturing the battery pack.

Also, since the connection member (B) is embedded in the insulative mounting member, it is possible to minimize the size of the connection member (B), thereby increasing the capacity of the battery pack as compared with other battery packs having the same standard.

BRIEF DESCRIPTION OF THE DRAWINGS

The above and other objects, features and other advantages of the present invention will be more clearly understood from the following detailed description taken in conjunction with the accompanying drawings, in which.

BEST MODE FOR CARRYING OUT THE INVENTION

Now, exemplary embodiments of the present invention will be described in detail with reference to the accompanying drawings. It should be noted, however, that the scope of the present invention is not limited by the illustrated embodiments.

Figure 1:
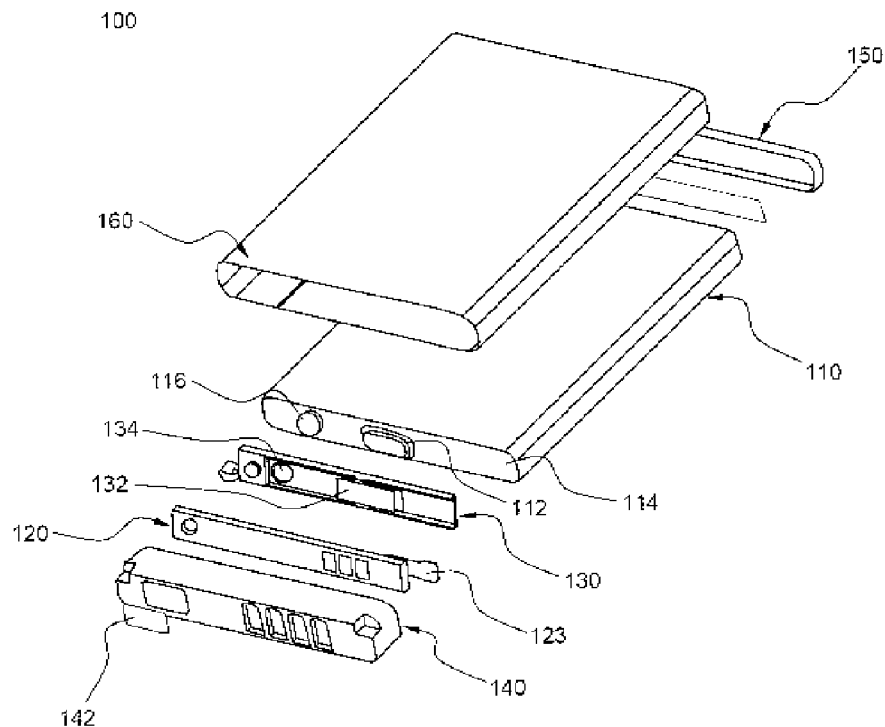
FIG. 1 is an exploded perspective view illustrating a secondary battery pack according to an exemplary embodiment of the present invention.

FIG. 1 is an exploded perspective view typically illustrating a secondary battery pack according to an exemplary embodiment of the present invention.

Referring to FIG. 1, the secondary battery pack 100 includes a battery cell 110 having an electrode assembly received in a battery case together with an electrolyte in a sealed state, a protection circuit module (PCM) assembly 120 for effectively controlling an abnormal state, such as overcharge, of the battery cell 110, an insulative mounting member 130 mounted at the top 114 of the battery cell 110, the PCM assembly 120 being loaded on the insulative mounting member 130, a top cap 140 coupled to the upper end of the battery cell 110 for covering the insulative mounting member 130 in a state in which the PCM assembly 120 is loaded on the insulative mounting member 130, an insulative bottom cap 150 coupled to the lower end of the battery cell 110, and a sheathing film 160 attached to the outer surface of the battery case of the battery cell 110 for covering the battery case of the battery cell 110.

At the top 114 of the battery cell 110 is formed an anode terminal 112 which protrudes upward while being isolated from the battery case. The remaining region of the top 114 of the battery cell 110 excluding the anode terminal 112 serves as a cathode terminal. At one side of the top of the battery cell 110 is formed an electrolyte injection port 116 which protrudes in the plan shape of a circle. The electrolyte injection port 116 is sealed by a metal ball or a polymer resin.

The insulative mounting member 130 is loaded on the top 114 of the battery cell 110 and is joined to the top 114 of the battery cell 110 in a bonding fashion. A connection member (B) 132 is embedded in the insulative mounting member 130 while the top and bottom of the connection member (B) 132 are exposed to the outside. Also, an opening 134 is formed in a predetermined region of one side of the insulative mounting member 130 such that the sealed electrolyte injection port 116 is exposed upward through the opening 134.

The PCM assembly 120 is constructed in a structure in which a connection member (A) 123 is coupled to the bottom of a protection circuit module (PCM). Specifically, the connection member (A) 123 is coupled to the bottom of the PCM such that a welded region of the connection member (A) 123 with respect to the battery cell 110 protrudes from one end of the PCM assembly 120 in the lateral direction of the battery cell 110.

The insulative top cap 140 is coupled to the upper end of the battery cell 110 for covering the insulative mounting member 130 in a state in which the PCM assembly 120 is loaded on the insulative mounting member 130. The insulative top cap 140 extends downward by a predetermined length to cover the outside surface of the upper end of the battery cell 110. An after-sales service (A/S) label 142 is attached to one side of the top of the insulative top cap 140.

The sheathing film 160 is attached to the outer surface of the battery case for securing the electrically insulation of the battery cell 110 from the outside and indicating the information of a product. The sheathing film 160 is made of a heat shrinkable material. The sheathing film 160 is manufactured in the shape of a tube. When heat is applied to the sheathing film 160 after the battery cell 110 is covered by the sheathing film 160, the sheathing film 160 shrinks, with the result that the sheathing film 160 comes into tight contact with the outer surface of the battery case of the battery cell 110.

Figure 2:
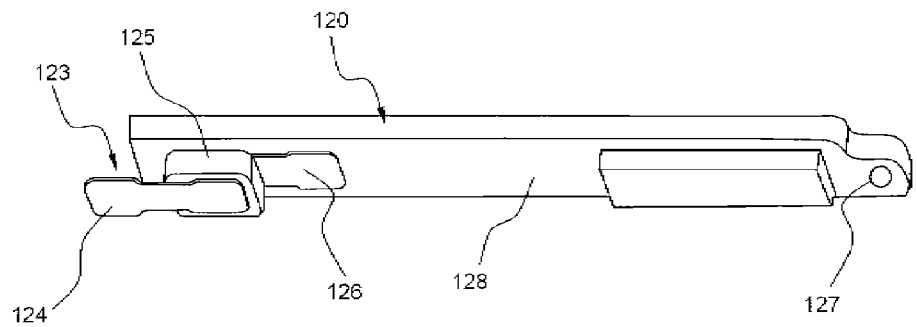
FIG. 2 is a typical view illustrating a structure in which a connection member (A) is coupled to the bottom of a protection circuit module (PCM) assembly.
Figure 3:
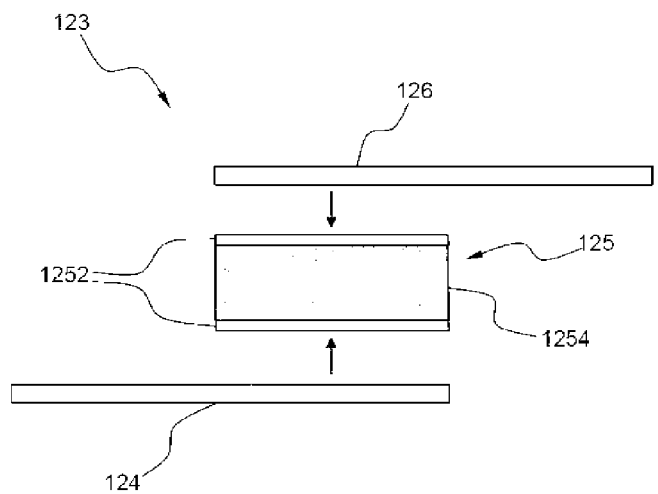
FIG. 3 is a vertical sectional view typically illustrating the connection member (A) of FIG. 2.
Figure 4:
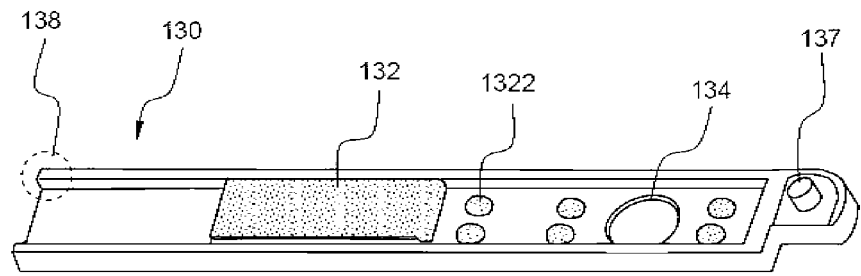
FIG. 4 is a typical view illustrating a structure in which a connection member (B) is embedded in an insulative mounting member.

FIG. 2 is a typical view illustrating a structure in which the connection member (A) is coupled to the bottom of the PCM assembly, FIG. 3 is a vertical sectional view typically illustrating the connection member (A) of FIG. 2, and FIG. 4 is a typical view illustrating a structure in which the connection member (B) is embedded in the insulative mounting member.

Referring to these drawings together with FIG. 1, the connection member (A) 123 is coupled to the bottom of the PCM assembly 120 by a surface mount technology (SMT), and a through-hole 127 is formed in one side of the PCM assembly 120 such that a coupling member 137 of the insulative mounting member 130 is inserted and coupled in the through-hole 127.

The connection member (A) 123, electrically connected to the top 114 of the battery cell 110, includes a plate-shaped PCM coupling part 126, a plate-shaped battery cell coupling part 124, and a positive temperature coefficient (PTC) body 125 disposed between the plate-shaped PCM coupling part 126 and the plate-shaped battery cell coupling part 124.

The PTC body 125 includes a PTC material layer 1254, made of a polymer composite, of which the resistance changes depending upon temperature and metal foils 1252 joined to the top and bottom of the PTC material layer 1254. Also, the battery cell coupling part 124 of the connection member (A) 123 protrudes from one end of the PCM assembly 120 in the lateral direction of the battery cell 110.

The remaining region of the connection member (B) 132, excluding the top of the connection member (B) 132 facing a terminal connection part 128 of the PCM assembly 120 and the bottom of the connection member (B) 132 facing the anode terminal 112 of the battery cell 110, is embedded in the insulative mounting member 130 by insert injection molding. At least a plurality of portions 1322 of the connection member (B) 132 embedded in the insulative mounting member 130 protrude from the top of the insulative mounting member 130 in the shape of a protrusion in a direction perpendicular to the top of the insulative mounting member 130 such that the portions 1322 of the connection member (B) 132 are exposed upward. Also, the coupling member 137 of the insulative mounting member 130 protrudes upward by a predetermined height at a position corresponding to the through-hole 127 of the PCM assembly 120.

Consequently, the connection member (A) 123 is coupled to the top 114 of the battery cell 110, which serves as the cathode terminal, by welding. Also, the bottom of the connection member (B) 132 is coupled to the protruding anode terminal 112 of the battery cell 110 by welding, and the top of the connection member (B) 132 is brought into physical contact with the terminal connection part 128 of the PCM assembly 120 such that the top of the connection member (B) 132 is electrically connected to the terminal connection part 128 of the PCM assembly 120. Consequently, the electrical connection between the battery cell 110 and the PCM assembly 120 is achieved. The physical contact type connection means electrical connection naturally achieved by the coupling between the PCM assembly 120 and the insulative mounting member 130 when the connection member (A) 123 is welded to the battery cell 110 and the coupling member 137 is inserted into the through-hole 127.

Meanwhile, the connection members 123 and 132 are connected to the electrode terminals 112 and 114 of the battery cell 110, respectively, while not being bent as shown in FIGS. 2 and 4. Consequently, it is possible to use connection members having a size smaller than that of the conventional connection members. Furthermore, it is not necessary to bend the connection members during the assembling process, and therefore, a dead space for bending is not required.

Figure 5:
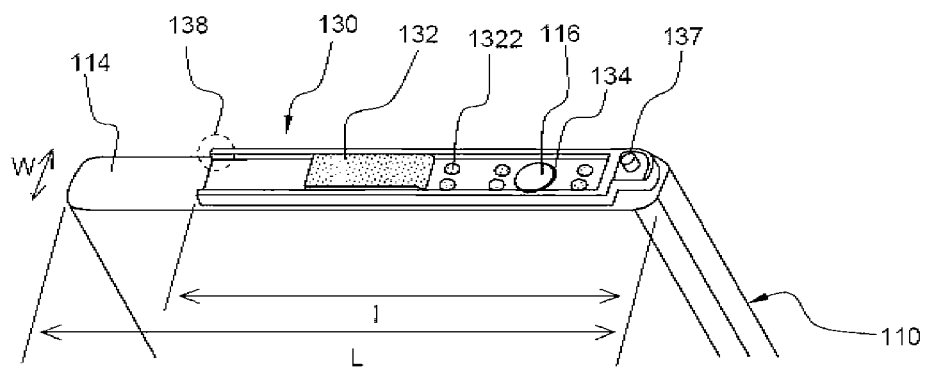
FIG. 5 is a perspective view illustrating a state in which an insulative mounting member is mounted to a battery cell in the battery pack shown in FIG. 1.

FIG. 5 is a perspective view typically illustrating a state in which the insulative mounting member is mounted to the battery cell in the battery pack shown in FIG. 1.

Referring to FIG. 5 together with FIG. 1, the insulative mounting member 130 is attached to the top 114 of the battery cell 110 by an adhesive. The anode terminal 112 of the battery cell is coupled to the bottom of the connection member (B) 132 by welding. Also, the sealed electrolyte injection port 116 of the battery cell 110 is inserted through the opening 134 of the insulative mounting member 130, and is exposed upward from the insulative mounting member 130.

Receiving sidewalls 138 protrude upward by a predetermined height from opposite ends of the insulative mounting member 130 in the lateral direction of the insulative mounting member 130 such that the PCM assembly 120 is stably mounted to the insulative mounting member 130 by the receiving sidewalls 138.

The insulative mounting member 130 has a length l less than the length L of the top 114 of the battery cell 110 in the lateral direction of the battery cell 110. A portion L−l of the top 114 of the battery cell 110 exposed by this structure is used as the cathode terminal for connection with the connection member (A) 123.

Also, the coupling member 137 is formed at one end of the insulative mounting member 130 in the longitudinal direction of the insulative mounting member 130 such that the coupling member 137 protrudes upward. Correspondingly, the through-hole 127 is formed in the PCM assembly 120. Consequently, it is possible to achieve the inposition coupling between the insulative mounting member 130 and the PCM assembly 120 and to increase the coupling strength between the insulative mounting member 130 and the PCM assembly 120.

Figure 6:
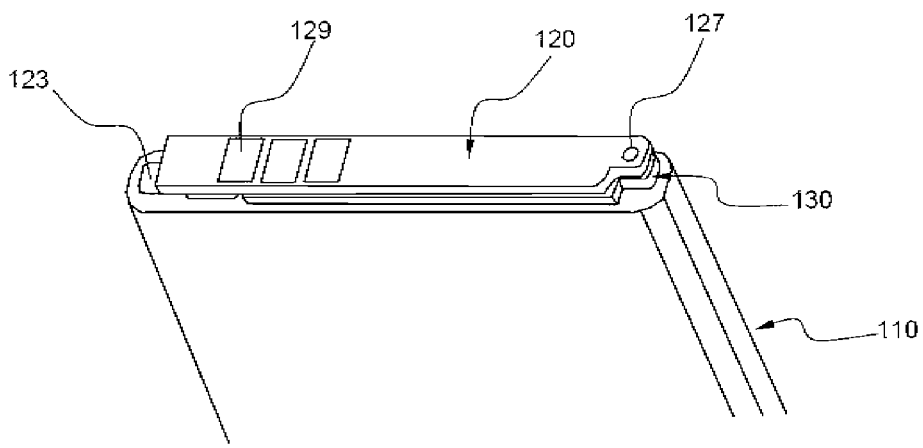
FIG. 6 is a perspective view illustrating a structure in which a PCM assembly is loaded on the insulative mounting member shown in FIG. 5.

FIG. 6 is a perspective view typically illustrating a structure in which the PCM assembly is loaded on the insulative mounting member shown in FIG. 5.

Referring to FIG. 6 together with FIGS. 2 and 4, the coupling member 137 of the insulative mounting member 130 is inserted through the through-hole 127 of the PCM assembly 120, and, at the same time, the terminal connection part 128 of the PCM assembly 120 is located at the top of the connection member (B) 132 of the insulative mounting member 130 such that the terminal connection part 128 of the PCM assembly 120 is brought into contact with the top of the connection member (B) 132 of the insulative mounting member 130.

Subsequently, the battery cell coupling part 124 of the connection member (A) 123 is located at the top 114 of the battery cell 110, and then the battery cell coupling part 124 and the top 114 of the battery cell 110 are coupled to each other by welding. As a result, the electrical connection and the mechanical coupling between the connection member (A) 123 and the battery cell 110 are achieved.

Also, external input and output terminals 129 for electrical connection with an external device (not shown) are formed at the left side of the top of the PCM assembly 120. Of course, the external input and output terminals 129 may be selectively formed at an arbitrary region of the PCM assembly 120. For example, the external input and output terminals 129 may be at the middle or the right side of the PCM assembly 120 in addition to the left side of the PCM assembly 120.

Figure 7:
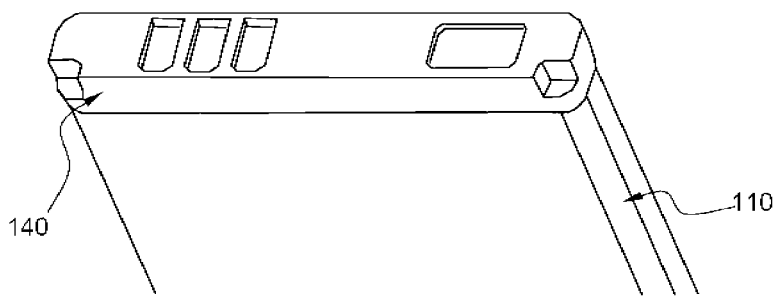
FIG. 7 is a typical view illustrating a structure in which an insulative top cap is coupled to the structure shown in FIG. 6.

FIG. 7 is a typical view illustrating a structure in which the insulative top cap 140 is coupled to the structure shown in FIG. 6. Referring to FIG. 7, at least a portion of the insulative top cap 140 extends downward by a predetermined length to cover the outside surface of the upper end of the battery cell 110. The portion of the insulative top cap 140 is attached to the outside surface of the upper end of the battery cell 110 by an adhesive.

Figure 8:
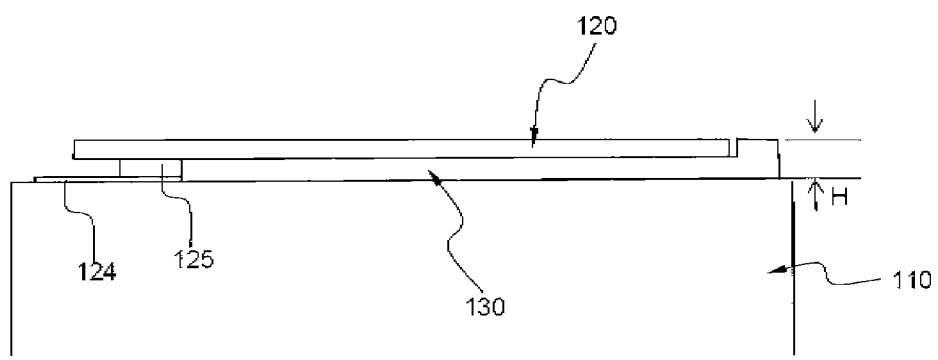
FIG. 8 is a typical front view of FIG. 6.

FIG. 8 is a typical front view of FIG. 6.

Referring to FIG. 8, the insulative mounting member 130 has a height H much less than that of a conventional secondary battery pack (not shown). Consequently, it is possible to increase the capacity of the battery cell 110 by as much as the volume corresponding to the reduced height.

INDUSTRIAL APPLICABILITY

As apparent from the above description, the secondary battery pack according to the present invention is constructed in a structure in which the connection member (A) is coupled to the bottom of the PCM while protruding from one end of the PCM assembly in the lateral direction, and the connection member (B) is embedded in the insulative mounting member while the top and bottom of the connection member (B) are exposed to the outside. Consequently, the present invention has the effect of reducing the number of the process steps and manufacturing the battery pack in a more compact structure. Also, it is possible to reduce the size of the internal space of the battery pack where the PCM assembly and the insulative mounting member are mounted through the provision of this structure. Consequently, the present invention has the effect of increasing the capacity of the battery pack as compared with other battery packs having the same standard.

Although the exemplary embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A secondary battery pack comprising:
   a battery cell having an electrode assembly of a cathode/separator/anode structure mounted in a battery case together with an electrolyte in a sealed state and a first electrode terminal and a second electrode terminal formed at an upper end of the battery case;
   a protection circuit module (PCM) assembly including a PCM and a first connection member coupled to a bottom of the PCM, the PCM assembly being provided in one side thereof with a through-hole for coupling with an insulative mounting member;
   the insulative mounting member being configured such that the PCM assembly is loaded on the top of the insulative mounting member, the insulative mounting member having a second connection member coupled to the second electrode terminal of the battery cell, the second connection member being embedded in the insulative mounting member with a top and bottom of the second connection member being exposed to the outside, the insulative mounting member having a coupling member formed at a position corresponding to the through-hole, the insulative mounting member being mounted at a top of the battery cell; and an insulative cap coupled to an upper end of the battery cell to cover the insulative mounting member when the PCM assembly is loaded on the insulative mounting member, wherein the second connection member is coupled to the second electrode terminal of the battery cell by welding such that the second connection member is electrically connected to the second electrode terminal of the battery cell when the insulative mounting member is mounted on the battery cell, wherein the first connection member protrudes from one end of the PCM assembly in a lateral direction such that a region of the first connection member electrically connected to the battery cell is exposed upward from the PCM assembly, whereby the first connection member is coupled to the first electrode terminal of the battery cell upward from the PCM such that the first connection member is electrically connected to the first electrode terminal of the battery cell, in a state in which the PCM assembly is loaded on the insulative mounting member by the insertion of the coupling member into the through-hole, and wherein the electrical connection between the PCM assembly and the second connection member is provided by physical contact.

2. The secondary battery pack according to claim 1, wherein the battery case is a metal container.

3. The secondary battery pack according to claim 1, wherein the first electrode terminal is a cathode terminal, and the second electrode terminal is an anode terminal.

4. The secondary battery pack according to claim 1, wherein the first connection member is coupled to a bottom of the PCM by a surface mount technology.

5. The secondary battery pack according to claim 1, wherein the first connection member comprises a positive temperature coefficient (PTC) element including a PTC body, a PCM coupling part coupled to a top of the PTC body, and a battery cell coupling part coupled to a bottom of the PTC body, the battery cell coupling part protruding from one end of the PCM assembly in the lateral direction such that the battery cell coupling part is exposed upward from the PCM assembly.

6. The secondary battery pack according to claim 5, wherein the PTC body includes a PTC material layer made of a polymer composite and metal foils joined to a top and a bottom of the PTC material layer.

7. The secondary battery pack according to claim 5, wherein the PCM coupling part and the battery cell coupling part are formed of a metal plate.

8. The secondary battery pack according to claim 1, wherein a remaining region of the second connection member, excluding the top of the second connection member facing a terminal connection part of the PCM assembly and the bottom of the second connection member facing the corresponding electrode terminal of the battery cell, is embedded in the insulative mounting member.

9. The secondary battery pack according to claim 8, wherein the second connection member is embedded in the insulative mounting member when forming the insulative mounting member by insert injection molding.

10. The secondary battery pack according to claim 8, wherein at least a portion of the second connection member embedded in the insulative mounting member protrudes from the top of the insulative mounting member in the shape of a protrusion in a direction perpendicular to the top of the insulative mounting member such that the portion of the second connection member is exposed upward, whereby the second connection member is stably fixed to the insulative mounting member.

11. The secondary battery pack according to claim 1, wherein the second connection member is formed of a nickel plate.

12. The secondary battery pack according to claim 1, wherein the insulative mounting member has a size less than the top of the battery cell in a lateral direction of the battery cell such that the insulative mounting member is provided with a region where the first connection member is connected to the battery cell, and the insulative mounting member is provided with an opening formed at a position spaced a predetermined distance from the second connection member coupled to the second electrode terminal of the battery cell such that an upper-end case protrusion of the battery cell is exposed upward through the opening.

13. The secondary battery pack according to claim 1, wherein the insulative mounting member is provided at opposite ends thereof in a lateral direction with receiving sidewalls protruding upward such that the PCM assembly is stably mounted to the insulative mounting member by the receiving sidewalls.

14. The secondary battery pack according to claim 1, wherein the coupling between the top of the battery case and the insulative mounting member is achieved by bonding.

15. The secondary battery pack according to claim 1, further comprising a sheathing film attached to an outer surface of the battery case.

16. The secondary battery pack according to claim 1, wherein the battery cell is a prismatic lithium secondary battery cell.

* * * * *